United States Patent
Kreis et al.

(10) Patent No.: US 11,112,326 B2
(45) Date of Patent: Sep. 7, 2021

(54) SCREW-IN ARRANGEMENT COMPOSED OF A MEASURING DEVICE AND A CONTAINER

(71) Applicant: IFM ELECTRONIC GMBH, Essen (DE)

(72) Inventors: Stefan Kreis, Tettnang (DE); Guido Knoll, Wangen (DE)

(73) Assignee: IFM ELECTRONIC GMBH, Essen (DE)

( * ) Notice: Subject to any disclaimer, the term of this patent is extended or adjusted under 35 U.S.C. 154(b) by 16 days.

(21) Appl. No.: 16/756,179

(22) PCT Filed: Oct. 10, 2018

(86) PCT No.: PCT/EP2018/077610
§ 371 (c)(1),
(2) Date: Apr. 15, 2020

(87) PCT Pub. No.: WO2019/076699
PCT Pub. Date: Apr. 25, 2019

(65) Prior Publication Data
US 2021/0190620 A1    Jun. 24, 2021

(30) Foreign Application Priority Data

Oct. 16, 2017 (DE) .......................... 10 2017 124 031
Nov. 29, 2017 (DE) .......................... 10 2017 128 291

(51) Int. Cl.
*G01L 19/00* (2006.01)
*F16J 15/12* (2006.01)
*G01L 19/14* (2006.01)

(52) U.S. Cl.
CPC ............ *G01L 19/003* (2013.01); *F16J 15/127* (2013.01); *G01L 19/14* (2013.01)

(58) Field of Classification Search
None
See application file for complete search history.

(56) References Cited

U.S. PATENT DOCUMENTS 6,197,136 B1 * 3/2001 Hishinuma ....... B29C 66/91221
    156/228
2013/0175762 A1 * 7/2013 Meller .................. F16L 27/087
    277/500

FOREIGN PATENT DOCUMENTS

DE      20106824 U1    8/2001
DE      19628551 B4    4/2004
(Continued)

OTHER PUBLICATIONS

International Search Report and Written Opinion in Corresponding Patent Application No. PCT/EP2018/077610 dated Feb. 1, 2019. 12 pages.

(Continued)

*Primary Examiner* — Andre J Allen
*Assistant Examiner* — Jermaine L Jenkins
(74) *Attorney, Agent, or Firm* — Leason Ellis LLP (57) ABSTRACT

The invention relates to an arrangement composed of a measuring device and a container, wherein the measuring device (1) is suited for insertion into the container, which contains the medium to be measured, and wherein the container for receiving the measuring device (1) has a connector piece (20) having a passage opening extending in an axial direction and a seal land (22) projecting into the passage opening, wherein the measuring device (1) comprises a rotationally symmetric housing part (10), which is flush with the connector piece (20) and has an external cone portion (11), which forms with an internal cone portion (21) provided on the connector piece (20) a beveled sealing surface pair. According to the invention, the sealing element in the region of the external and internal cone portions (11, 21) consists in the front end section, which faces the medium, at least partially of a plastic, especially PEEK, or an elastomer and consists in the adjoining second section (32), facing away from the medium, of metal or ceramic or (Continued)

a fiber-reinforced plastic so that a defined and thus pressure- and force-resistant stop results in the axial direction between the external cone portion (11) of the measuring device (1) and the internal cone portion (21) of the connector piece (20), while independently thereof the sealing function is achieved exclusively in the front end section (31), facing the medium, of the sealing element (30).

10 Claims, 4 Drawing Sheets

(56) References Cited

FOREIGN PATENT DOCUMENTS

| | | |
|---|---|---|
| DE | 10324818 A1 | 1/2005 |
| DE | 102009028661 A1 | 5/2010 |
| DE | 102011075698 A1 | 11/2011 |
| DE | 102009028662 B4 | 11/2014 |
| DE | 102014215503 A1 | 2/2016 |
| DE | 102016212220 A1 | 1/2017 |
| EP | 2136192 A1 | 12/2009 |
| WO | 2018099666 A1 | 6/2018 |

OTHER PUBLICATIONS

International Preliminary Report on Patentability in Corresponding Patent Application No. PCT/EP2018/077610 dated Apr. 21, 2020. 8 pages.

Hauser, G. [u.a.]; CCFRA Technology Ltd.: Hygienic equipment design criteria. 2. ed.. Chipping Campden: 2004 (EHEDG guidelines : Doc.; 8). S. 1-14.—ISBN 0-907503-13-6. 16 pages.

Hygienic pipe couplings, Trends in Food Science & Technology, vol. 8, Issue 3, Mar. 1997, pp. 88-92, ISSN 0924-2244, doi:10.1016/S0924-2244(97)01020-0 http://www.sciencedirect.com/science/article/pii/S0924224497010200. 5 pages.

SILIT Schnellkochtopf Gebrauchsanleitung 4.5.2010 https://www.wmf.com/media/wmf_upload/bedienungsanleitungen/de/Gebrauchsanleitung_Sicomatic_t-plus_20101001_2889.pdf [rech. 22.4.2016]. 37 pages.

Norm DIN 11853-1 2011-04-00. Armaturen aus nichtrostendem Stahl für Lebensmittel und Chemie—Teil 1: Hygiene-Rohrverschraubung, kurze Ausführung. 19 pages.

Moldflon Produktdatenblatt ElringKlinger Jun. 29, 2015 http://www.elringklinger-kunststoff.de/fileadmin/user_upload/pdf/service/katalog-downloads/175_Bro_Moldflon_2012_D_save.pdf [rech. Apr. 22, 2016], 24 pages.

Wacker Solid and Liquid Silicone Rubber Material and Processing Guidelines 6709_EN Seite 69. http://web.archive.org/web/20140628102600/http://www.wacker.com/cms/media/publications/downloads/6709_EN.pdf Mar. 25, 2014 [rech. May 27, 2015] 4 pages.

Höhler, A. [u.a.]; CCFRA Technology Ltd.: Hygienic design and application of sensors. Chipping Campden: 2008 (EHEDG guidelines : Doc. ; 37). S. 1-35.—ISBN 978-0-907503-31-6. 36 pages.

German Office Action in Corresponding German Patent Application No. 102017128291.2 dated Apr. 13, 2018. 3 pages.

German Office Action in Corresponding German Patent Application No. 102017128291.2 dated May 17, 2018. 3 pages.

* cited by examiner

SCREW-IN ARRANGEMENT COMPOSED OF A MEASURING DEVICE AND A CONTAINER

CROSS-REFERENCE TO RELATED PATENT APPLICATIONS

This application is a U.S. National Stage Application under 35 U.S.C. § 371 of International Patent Application No. PCT/EP2018/077610, filed Oct. 10, 2018, which claims the benefit of priority of German Patent Application numbers DE 10 2017 124 031.4 filed Oct. 16, 2017, and DE 10 2017 128 291.2 filed Nov. 29, 2017, all of which are incorporated by reference in their entireties. The International Application was published on Apr. 25, 2019, as International Publication No. WO 2019/076699 A1.

The present invention relates to an arrangement composed of a measuring device and a container containing the medium to be measured.

Automation technology utilizes measuring devices that are used for monitoring a medium or a property of a medium. In doing so, the fill level, pressure or temperature of the medium in a container is often measured. Usually, such measuring devices consist of a bottom part referred to as a process connection and a housing placed on that as a top part, which serves primarily to protect the sensor and the associated electronics. In this way, the process connection establishes the connection of the measuring device to a container or a pipe or a connector piece and usually contains the sensor element itself. In pressure measuring devices for example, the sensor element is designed as a piezo-resistive or capacitive measurement cell.

To connect the measuring device to the system or the container, in which the medium to be measured is located, connector-type adapters have proven to be advantageous, as they are described for example in the German patent specification DE 196 28 551 B4. These adapters have a passage opening extending in an axial direction and an encircling seal land located in this passage opening. Typically, the measuring device is screwed into the adapter, wherein the bottom side of the measuring device, i.e., the process connection, abuts the encircling seal land. By screwing the measuring device using a specified torque, the contact pressure between the process connection and the seal land of the adapter can be defined.

To seal the connection between the measuring device or process connection and the adapter, various sealing elements are suitable, wherein elastomer seals, i.e., O-rings, are often used. However, elastomer seals are subject to ageing and must therefore be replaced on a regular basis.

To achieve a connection, which is cleanable in an optimized manner and stable over the long term, between the adapter and the measuring device or process connection, the German patent specification DE 10 2009 028 662 B4 proposes to construct the sealing element out of a chemically resistant and temperature-resistant thermoplastic plastic, especially out of polyether ether ketone (PEEK). PEEK is chemically very stable and has a high level of long-term stability given typical load-types and temperature ranges, for example in the food and pharmaceutical industries. In addition, a sealing element made of PEEK allows for an optimal load distribution between the seal land and the process connection given a minimum contact surface between the outer end of the seal land and the sealing element, so that a maximum compression of the sealing element is possible in a quasi linear region. Basically, polytetrafluoroethylene (PTFE) is also conceivable with some restrictions.

However, the embodiment described in the mentioned patent specification requires that the wall thickness of the process connection is at least 3.5 mm to relieve the pressure measurement cell of any loads. Furthermore, in this embodiment, the stability of the depicted PEEK sealing element is essentially achieved by its ring thickness. To enable maximum compression between the seal land and the process connection, the sealing ring requires an upper stop so that the application of the force does not result in a displacement of the sealing ring.

However, if a small adapter is needed for the container due to its small diameter, especially for a pipe, the diameter of the measuring device must consequently also be minimized. However, due to the internally positioned pressure measurement cell, not any size reduction of said cell is possible. Further minimizing the arrangement consisting of an adapter, sealing element and measuring device consequently means a reduced thickness of the PEEK ring, as a result of which however its required stability would be lost.

The invention is based on an arrangement composed of a measuring device and a container containing the medium to be measured, as said invention is disclosed in the published patent application DE102016212220A1. In the arrangement depicted there, it is necessary that the measuring device is screwed into the connector piece of the container with a specified torque to obtain an optimal sealing effect.

The object of the invention is to improve this arrangement such that the screwing-in of the measuring device into the connector piece of the container is simplified.

The object is achieved by an arrangement having the features of claim 1. Advantageous embodiments of the invention are provided in the dependent claims.

To be able to screw the measurement device into the connector piece of the container without a torque wrench, the sealing element between the sealing surfaces of the measuring device and connector pieces, i.e., between the outer and internal cone portion, must be constructed in such a manner that it can resist large pressures even at higher screw-in torques without any appearance of relaxation and creeping or flowing. However, an especially stiff and thus resistant material required for this is usually unsuitable as a sealing material for the actual sealing between a measurement device and connector piece.

Therefore, the sealing element according to the invention is divided into at least two sections, with an end section that is arranged in the front region, facing the medium, of the sealing element, and a second section adjoining it, facing away from the medium. The front section assumes the actual sealing function between the measurement device and connector piece, while the second section is provided for ensuring a defined and thus pressure- or force-resistant stop during the screw-in process of the measurement device in the connector piece.

Both sections are at least partially arranged between the outer and internal cone portion, i.e., so that for example the section can extend all the way to the cylinder-shaped housing part of the measuring device.

The front end section of the sealing element consists at least partially of a chemically resistant and temperature-resistant thermoplastic plastic, especially polyether ether ketone (PEEK), or an elastomer. PEEK is especially well-suited because it provides the necessary form stability despite high loads at the sealing edge. Here, "partially" means that, according to an advantageous design, a coating or composition of multiple individual layers of various materials may be involved. A key factor is that the external layer ultimately responsible for the desired sealing effect consists of the said plastic. However, the sealing element may also be designed in a multi-part manner and the sections are joined to one another.

In the second section, which adjoins directly the front end section and faces away from the medium, the sealing element preferably consists of metal, whereby basically ceramic or a fiber-reinforced plastic may be suitable to achieve the effect according to the invention. This material specification ensures that the sealing element does not deform even when subjected to higher pressures or forces. It retains its original shape and will not yield to the forces acting on it. In this way, there results between the external cone portion of the measuring device and the internal cone portion of the connector piece a defined stop in an axial direction, while independently of that the sealing function is executed exclusively in the front end section, facing the medium, of the sealing element.

An advantageous design of the invention provides that the sealing element is divided into at least three sections, wherein only the front end section and the second section adjoining it are arranged between the outer and internal cone portion. The reason is that metal is needed only in the region where the internal cone portion is resting on the external cone portion, and thus the sealing element must resist the pressure generated by the screw-in torque. For an easier installation of the sealing element, it may be advantageous to execute the part extending all the way into the cylinder-shaped housing part of the measuring device out of a more flexible material.

To improve the connection between the materials between the sections, an especially advantageous design of the invention provides that the metallic second section has a structured surface on at least one side. In this way, a form fit can be created between the materials of both sections.

Preferably, the chemically resistant and temperature-resistant thermoplastic plastic or the elastomer of the end section is sprayed on the metal of the second section of the sealing element. For this, it is suitable to design the side, facing the end section, of the second section in a tooth-like manner. Providing undercuts may thereby be advantageous.

As an alternative to molding on the plastic or the elastomer, the metallic second section can also be overmolded, for which PEEK especially is suitable. The metallic second section is designed in this embodiment as a ring, wherein here, too, a structured surface in the form of a wave-like profile of the ring or a profile of the ring having a varying thickness or magnitude is suitable. In addition, it is advantageous to roughen the surface of the metal ring to achieve even better adhesion of the plastic of the overmolding with the metal. In this way, besides improved bonding between the materials, one also achieves the advantageous effect that in the second section of the sealing element, the metal and the overmolding are alternatingly part of the external surface and thus, despite the overmolding, the metal fulfills the function according to the invention of a defined stop.

Another advantageous design of the invention provides that a holding function for fixing the position of the sealing element is executed by the fact that in the region of the cylinder-shaped housing part, a bead arranged on the sealing element engages in a corresponding groove provided in the measuring device and/or connector piece, and a sealing function is achieved solely in the region of the outer and internal cone portion. As a result and in this way, the sealing function and the holding function of the sealing element are achieved independently of each other in two spatially separate regions. Alternatively, the sealing element can also be pushed onto the cone and the holding function in the cylinder-shaped housing part is achieved by means of a press fit.

The dimensions of the sealing element can be decreased in the region relevant to the seal without foregoing the advantages of maximum compression of the sealing element in a minimal contact surface between the outer end of the seal land and the sealing element. A displacement of the sealing element due to the effect of force is prevented by the internal cone portion so that the sealing element can be designed thin and flat.

The measuring device can be decreased in size in such a manner that pressure measuring cells for ½-inch process connections can be used and the wall thickness of the measuring device or the process connection is approx. 1.8 mm. In doing so, the result is an optimal load distribution because the wall thickness of the process connection in the region of the seal does not need to be reduced at this already minimal thickness by recesses, grooves and so on to receive a sealing ring.

Advantageously, the sealing element can be designed in such a manner that it contributes to the flush transition between the housing part of the measuring device and the connector piece. In this way, it is possible to design the transition from the process connection to the adapter or connector piece free of dead spaces so that the arrangement according to the invention can also be used in the pharmaceutical and food industries having special hygiene requirements.

Another advantageous development provides that the housing part has a tapering, which corresponds to the thickness of the sealing element, above the internal cone portion. This has the effect that the exterior diameter of the measuring device housing does not increase by applying the seal and has an essentially uniformly cylindrical exterior contour.

In a particularly advantageous development, the invention provides that the internal cone portion and the external cone portion are at an angle to each other. In this way, both sealing surfaces converge to the sealing edge at an acute angle so that a quasi linear surface results in which the connector piece contacts the sealing element adjoining the process connection. In this way, maximum compression of the sealing element in this region, as a result of which the requirements of the hygiene guidelines can be met. An alternative provides that both sealing surfaces can also run parallel to each other, but that the front end section of the sealing element has a form expanding in the direction of the sealing edge. The advantage of maximum compression of the sealing element exclusively at the sealing edge, i.e., in the region facing the medium, would then also result.

By the arrangement according to the invention composed of a measuring device, a container having a connector piece and a sealing element arranged in between, the user now has the ability to insert the measuring device in the connector piece without having to take into account a special tightening torque. This is because the metallic section of the sealing element results in a defined and thus pressure- and force-resistant stop in an axial direction, while independently of this the sealing function—with a defined compression—is achieved exclusively in the front end section, facing the medium, of the sealing element. Optionally, the sealing element in the end section can achieve the sealing function by means of an elastomer or by means of a chemically resistant and temperature-resistant thermoplastic plastic, especially PEEK. In addition, if desired the user can achieve a metal-metal seal by omitting the sealing element by the direct abutment of the measuring device and connector piece, i.e., the inner and external cone portion. The user is thereby given the utmost design freedom.

The invention is explained in greater detail below by means of embodiments with reference made to the drawings.

They show.

In the figures below, the same reference signs refer to the same parts having the same significance unless indicated otherwise.

Figure 1:
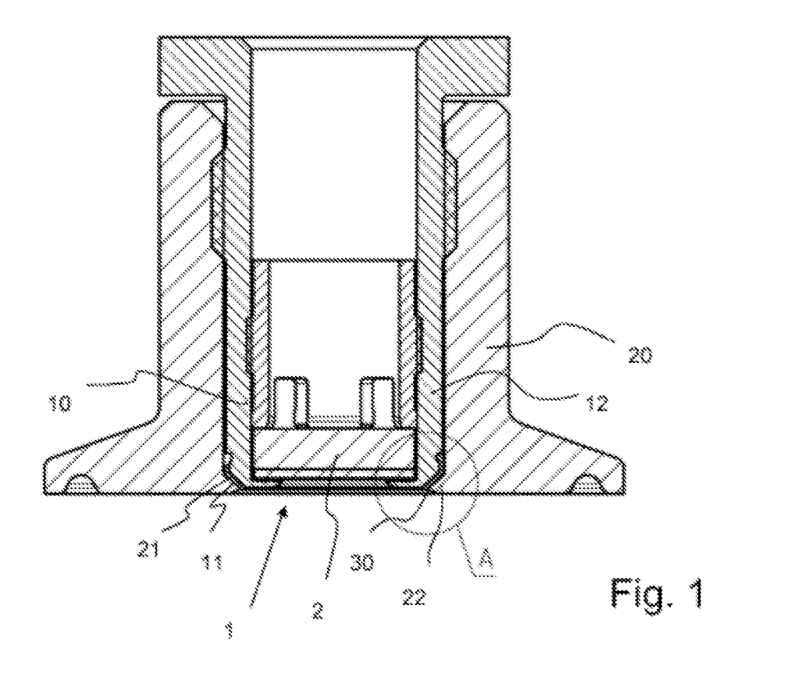
FIG. 1 an arrangement of a measuring device, a connector piece and an intermediate sealing element, FIG. 2 a magnified view of the subregion labelled "A" in FIG. 1, FIGS. 3a-3e a first embodiment of the sealing element according to the invention, FIGS. 4a-4d a second embodiment of the sealing element according to the invention, FIG. 5 a third embodiment of the sealing element according to the invention.

FIG. 1 depicts an arrangement composed of a measuring device 1, a connector piece 20 and an intermediate sealing element 30. In this case, the measuring device 1 is for example a pressure measuring device having a pressure measuring cell 2. The basic structure of this arrangement, in other words the measuring device 1 inserted, especially screwed, into the connector piece 20 is known per se. The measuring device 1 has a cylinder-shaped housing part 12—frequently also referred to as a process connection—having an external thread, which engages in an internal thread of the connector piece 20. The wall thickness of the process connection 12 is approx. 1.8 mm. Above the process connection 12, there is also a chamber for receiving sensor electronics and if applicable evaluation electronics as well as a connection device for signal and/or energy transmission. This region was not depicted for presentation reasons, especially since such a structure is known.

The connector piece 20 has on its lower end facing the medium an inwardly oriented seal land 22, which is referred to here as an internal cone portion 21 because of its conical profile. As a counterpiece to this internal cone 21, the measuring device 1 or the process connection 12 has an external cone portion 11. The sealing element 30 according to the invention is located between the external cone portion 11 and the internal cone portion 21.

The measuring device 1 is screwed into the connector piece 20 in a flush manner and achieves the absence of dead space required especially for the food and pharmaceutical industries, said absence of dead space preventing substances from being deposited in regions that are difficult or impossible to clean.

Figure 2:
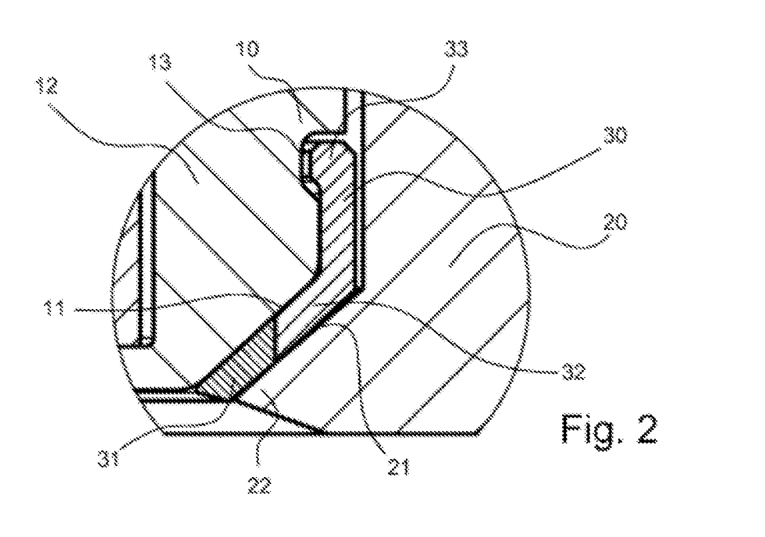

FIG. 2 depicts in a magnified manner the subregion labelled "A" in FIG. 1. One can now see that the sealing element 30 is divided into two sections: a front end section 31 facing the medium and adjoining that, a second section 32 facing away from the medium. The depicted embodiment can also be amended in such a manner that the sealing element 30 has three sections, wherein only the front end section 31 and the second section 32 adjoining that are arranged between the outer and internal cone portions 11, 21. The reason is that the material having the special properties regarding stiffness is required only in the region where the internal cone portion 21 abuts the external cone portion 11, and the sealing element 30 must thereby withstand the pressure generated by the screw-in torque. To assemble the sealing element 30 more easily, it may be advantageous to design the section extending into the cylinder-shaped housing part 12 of the measuring device out of a more flexible material.

The front end section 31 of the sealing element 30 consists at least partially of a chemically resistant and temperature-resistant thermoplastic plastic, especially polyether ether ketone (PEEK), or an elastomer.

In the second section 32, which directly connects to the front end section 31 and faces away from the medium, the sealing element 30 preferably consists of metal, especially stainless steel, wherein to achieve the effect according to the invention, basically ceramic or a fiber-reinforced plastic as well as polyphenylene sulfide (PPS) are also worth considering.

In this way, a defined and thus pressure- or force-resistant stop results between the external cone portion 11 of the measuring device and the internal cone portion 21 of the connector piece 20 in an axial direction because the material of the sealing element 30 does not deform even under the influence of higher pressures or forces due to the process of screwing the measuring device into the connector piece, but remains in its original form and does not yield to the forces being applied. Regardless, the sealing function is achieved exclusively in the front end section 31, which faces the medium, of the sealing element 30.

In FIG. 2, one can also see that the internal cone portion 21 and the external cone portion 11 are at an angle to each other. In this way, maximum compression of the sealing element 30 is achieved exclusively in a quasi linear sealing region facing the medium.

For holding the sealing element 30, it has on its rear end 32 facing away from the medium a bead 33, which engages with a groove 13, intended for that purpose, of the process connection 12. In this way, the holding function and the actual sealing can take place independently of each other and in spatially separate regions. The cylindrical region 32 of the sealing element 30 must thereby not be designed in a fully circumferential manner, but can be designed by means of longitudinally oriented tabs for example, which are arranged along the circumference of the sealing element 30 and are separated from each other by intermediate spaces. In this way, the bead 33 would then also not be fully circumferential, but only quasi-circumferential. Alternatively, the sealing element 30 can also be pushed onto the cone of the process connection 12 and the holding function in the cylinder-shaped housing part can be achieved by means of a press fit.

So as not to increase the outer diameter of the process connection due to the pushed-on seal 30, the diameter is narrowed in this region, advantageously precisely by the thickness of the sealing element 30.

The depicted arrangement of the measuring device 1 and the connector piece 20 also gives the user the option of omitting the sealing element 30. In this case, the outer and internal cone portions 11, 21 would rest directly on top of each other and a known metal-metal seal would result as a consequence of the angle at which both sealing surfaces are positioned to each other.

Figure 3A:
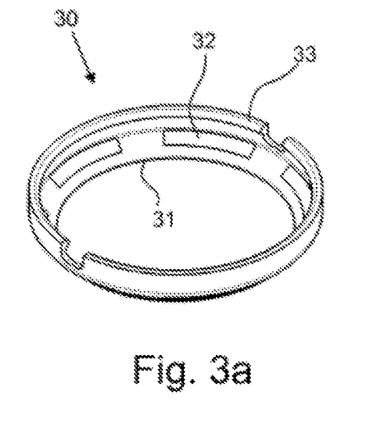
Figure 3B:
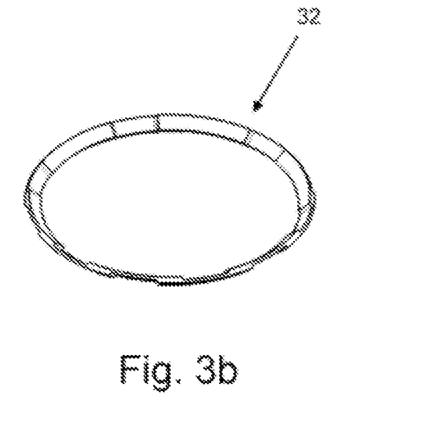

FIGS. 3a to 3e as well as 4a to 4d each show actual embodiments of the sealing element 30. In FIGS. 3a to 3e, the second section 32 is designed as a metal ring, which is overmolded by the thermoplastic plastic of the end section 31. PEEK in particular is suitable here, since this material can be readily injection-molded in addition to being temperature-resistant and chemically resistant. While FIG. 3b depicts the metal ring in detail, one can see in FIG. 3a that this metal ring 32 is encased by PEEK. In the end section 31, PEEK thus acts as a sealing material, but extends all the way into the upper section of the sealing element 30 and there forms the already mentioned bead 33, which is used for attaching the sealing element 30 to the process connection 12.

Figures 3C, 3D, 3E:
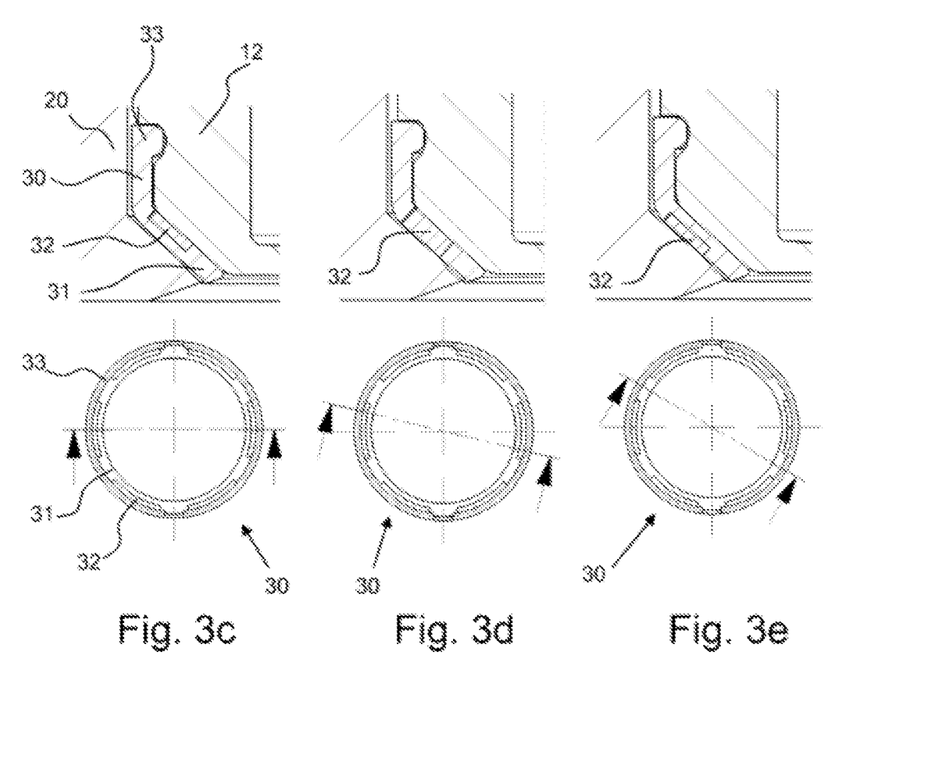

The unique feature is now the special design of the metal ring 32. It is namely formed of multiple, platelet-like ring segments, wherein the design is advantageously suitable as a stamped bending part. Two ring segments thereby always abut each other on their ends so that the metal ring 32 has at these locations a two-fold magnitude or thickness, while in between, the ring thickness is formed only by the single thickness of a "platelet." The reason for this special design of the metal ring 32 is that the thickness of the sealing element 30—at least in the region of the second section 32—corresponds exactly to the maximum ring thickness of the metal ring, so that as one can see in FIG. 3a, the metal ring is only sectionally overmolded with PEEK. A similar picture emerges at the outer surface, not depicted in FIG. 3a, of the sealing element 30. This alternating progression of the metal ring is depicted in FIGS. 3c to 3e in a cutaway view, wherein for the sake of better understanding, the position of the respective cutaway view is depicted from the top down—see in each case the lower image. In regard to the top view, it is to be pointed out that the complete metal ring 32 cannot be seen because in this view the bead 33 covers parts of the metal ring 32.

The upper images of FIGS. 3c and 3e each show a section at the location where the metal ring 32 has only a single thickness of a "platelet." Here, the metal ring 32 is arranged once on the upper surface facing the process connection 12 and once on the lower surface facing the connector piece 20. In contrast, in FIG. 3d, the cross-section occurs at the location where two "platelets" are superimposed and in this way the thickness of the metal ring 32 is formed from double the platelet thickness. As described earlier, in the region of the second section 32, the thickness of the sealing element 30 corresponds exactly to the maximum ring thickness of the metal ring so that at these locations where two "platelets" are superimposed—see FIG. 3d—a metal stop is achieved at least partially between the process connection 12 and the connector piece 20, despite the metal ring 32 being overmolded with PEEK.

FIGS. 4a to 4d depict a second embodiment of the sealing element 30. Here the sealing element 30 is formed of only two sections 31, 32. In the present case, the lower end section 31 facing the medium is molded onto the second section 32. Advantageously, the material for the end section 31 in this case is also PEEK.

Figure 4A:
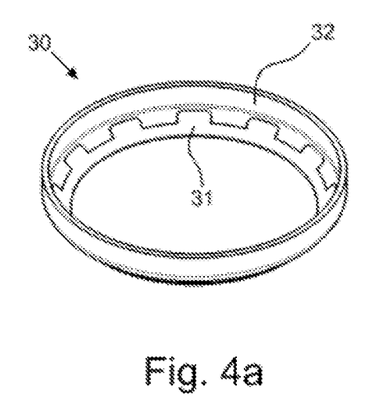
Figure 4B:
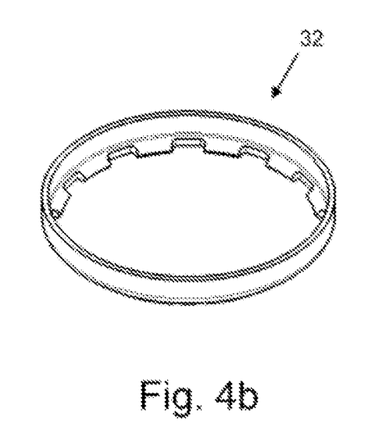

FIG. 4b depicts the second section 32 designed as a metal ring. One can see here that the lower side facing the end section 31 is designed in a tooth-like manner. This tooth-like structure can also have undercuts. In this way, the connection between the material of the end section 31 and the metal of the second section 32 is to be improved by means of a form fit.

Figure 4C:
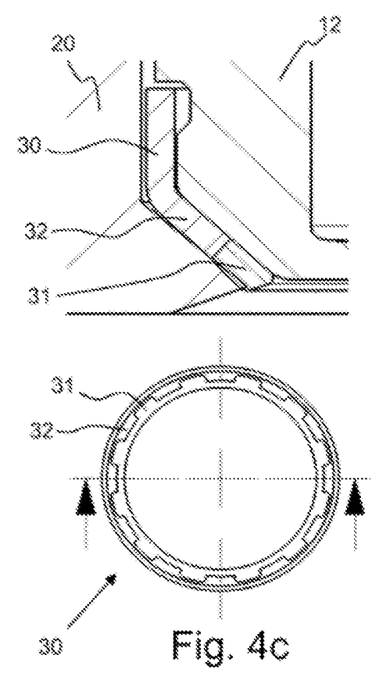
Figure 4D:
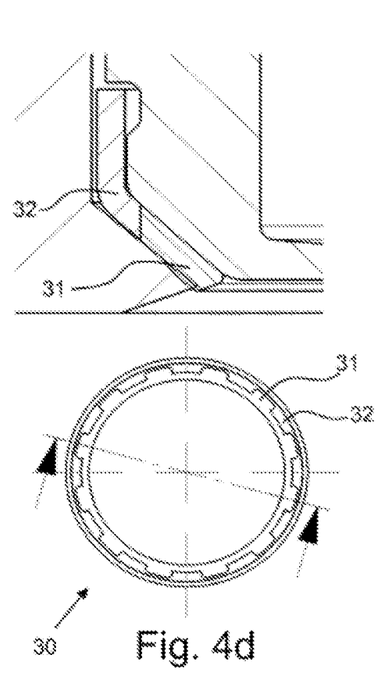

FIGS. 4c and 4d each depict longitudinal cross-sections, wherein the respective position of the cross-sections is depicted in the lower images. In this embodiment, the second section 32, i.e., the metal ring, extends all the way into the upper, cylinder-shaped portion of the process connection 12. The sealing element 20 attaches to the process connection 12 here by means of a press fit.

A different image results between FIGS. 4c and 4d due to the tooth-like structure of the metal ring 32. FIG. 4c depicts the portion of the metal ring 32, which produces the metal stop between the process connection 12 and the connector piece 20.

Figure 5:
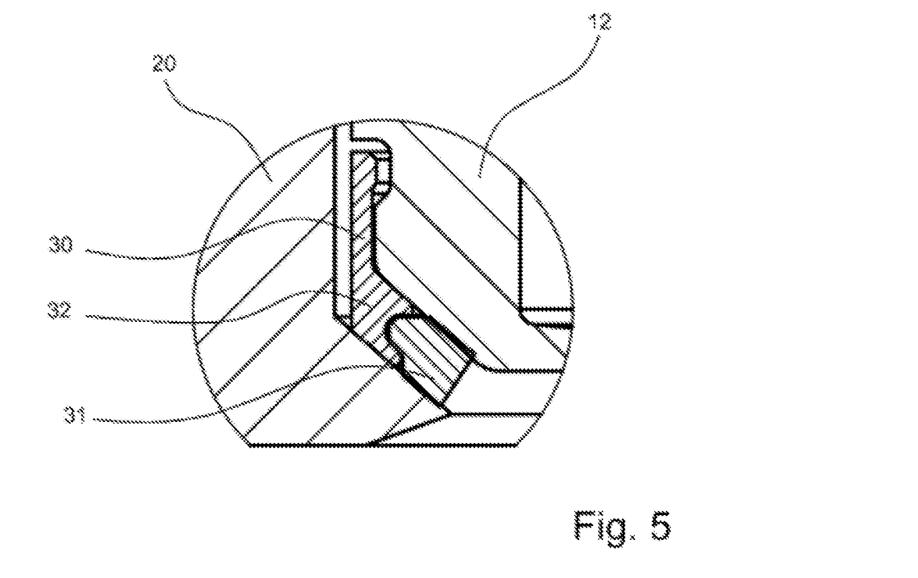

FIG. 5 depicts an additional alternative embodiment in which, similar to FIGS. 4a-d, a form fit, and thus an improved connection between the material of the end section 31 and the metal of the second section 32, is achieved by a recess in the lower side, which faces the end section 31, of the second section 32. An additional improvement of this connection can be achieved by providing an undercut. This undercut then allows for example that the end section 31 can be clipped into the second section 32. In this way, a reliable protection against loss is achieved.

The invention claimed is:

1. Arrangement of a measuring device and a container, wherein the measuring device (1) is suited for insertion into the container, which contains the medium to be measured, and wherein for receiving the measuring device (1) the container has a connector piece (20) having a passage opening extending in an axial direction and a seal land (22) projecting into the passage opening,
   wherein the measuring device (1) comprises a rotation-symmetric housing part (10), which ends on the medium side with the connector piece (20) in a flush manner and has an external cone portion (11), which with an internal cone portion (21) provided on the connector piece (20) forms a beveled pair of sealing surfaces,
   wherein between the rotation-symmetric housing part (10) of the measuring device (1) and the connector piece (20) there is arranged a sealing element (30) that is designed in a flat and cap-like manner and extends from the region of the external cone portion (11) all the way into an adjoining cylinder-shaped housing section (12) of the rotation-symmetric housing part (10),
   wherein the sealing element (30) is divided into at least two sections, with a front end section (31) facing the medium and adjoining that a second section (32) facing away from the medium,
   wherein both sections (31, 32) are arranged at least partially between the external and the internal cone portions (11, 21),
   and wherein the sealing element (30) consists in the front end section (31) facing the medium at least partially of a chemically resistant and temperature-resistant thermoplastic plastic or of an elastomer, and consists in the second section (32) facing away from the medium of metal or ceramics or a fiber-reinforced plastic, so that between the external cone portion (11) of the measuring device (1) and the internal cone portion (21) of the connector piece (20), there results a defined and thus pressure- and force-resistant stop in an axial direction, while independently from this the sealing function is achieved exclusively in the front end section (31), which faces the medium, of the sealing element (30).

2. Arrangement according to claim 1,
   wherein the sealing element (30) is constructed in one piece of metal and is coated in the front end section (31) facing the medium with the chemically resistant and temperature-resistant thermoplastic plastic or the elastomer.

3. Arrangement according to claim 1,
   wherein the sealing element (30) is constructed in a multi-part manner and the at least two sections (31, 32) are joined to each other.

4. Arrangement according to claim 1,
wherein the sealing element (30) is divided into at least three sections, wherein only the front end section (31) and the adjoining second section (32) are arranged between the external and internal cone portions (11, 21).

5. Arrangement according to claim 1,
wherein the second section (32) has on at least one side a structured surface for an improved bond with the material of the front end section (31).

6. Arrangement according to claim 5,
wherein the side, facing the front end section (31), of the second section (32) is designed in a toothed manner or the second section (32) is designed as a ring and a structured surface is designed in the form of a wave-like profile of the ring or a profile of the ring with varying thickness or magnitude.

7. Arrangement according to claim 6,
wherein the holding function of the sealing element (30) is achieved by there being, in the region of the cylinder-shaped housing section (12), a bead (33) arranged on the sealing element (30) engaged in a corresponding groove (13) provided in the cylinder-shaped housing section (12) of the measuring device (1) and/or in the connector piece (20).

8. Arrangement according to claim 1,
wherein the sealing function and a holding function for fixing the position of the sealing element (30) occur independently of each other in two spatially separate regions.

9. Arrangement according to claim 1,
wherein the sealing element is designed in such a manner that it contributes to the flush transition between the rotation-symmetric housing part (10) and the connector piece (20).

10. Arrangement according to claim 1,
wherein the internal cone portion (21) and the external cone portion (11) are at an angle to each other so that a maximum compression of the sealing element (30) occurs exclusively in a quasi linear sealing region facing the medium.

* * * * *